No. 867,528. PATENTED OCT. 1, 1907.
G. D. A. PARR.
POINT SHIFTER FOR TRAMWAYS AND THE LIKE.
APPLICATION FILED AUG. 18, 1905.
5 SHEETS—SHEET 1.
Fig. I.
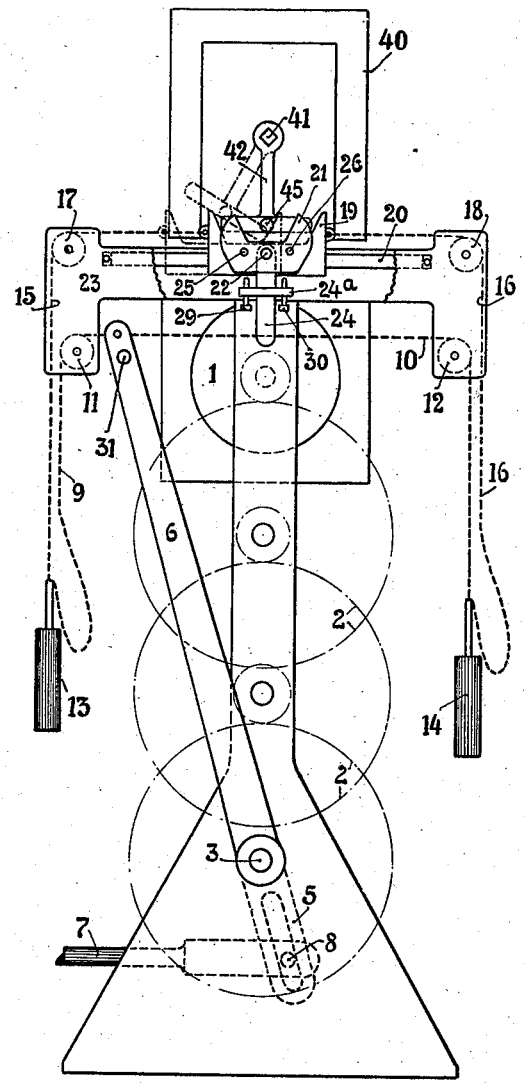
Fig. II.
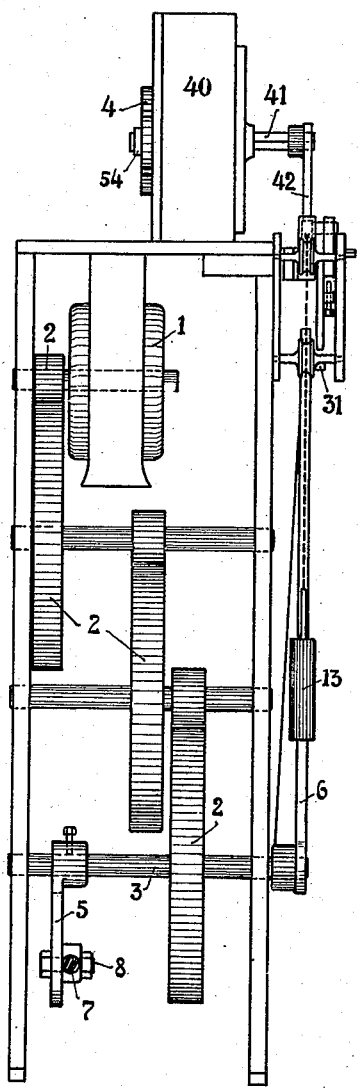
Witnesses:
F. T. Chapman
C. E. Marshall
Inventor:
George D. A. Parr.
By Lyons & Rissing.
Attorneys.

No. 867,528. PATENTED OCT. 1, 1907.
G. D. A. PARR.
POINT SHIFTER FOR TRAMWAYS AND THE LIKE.
APPLICATION FILED AUG. 18, 1905.
6 SHEETS—SHEET 2.
Fig. III.
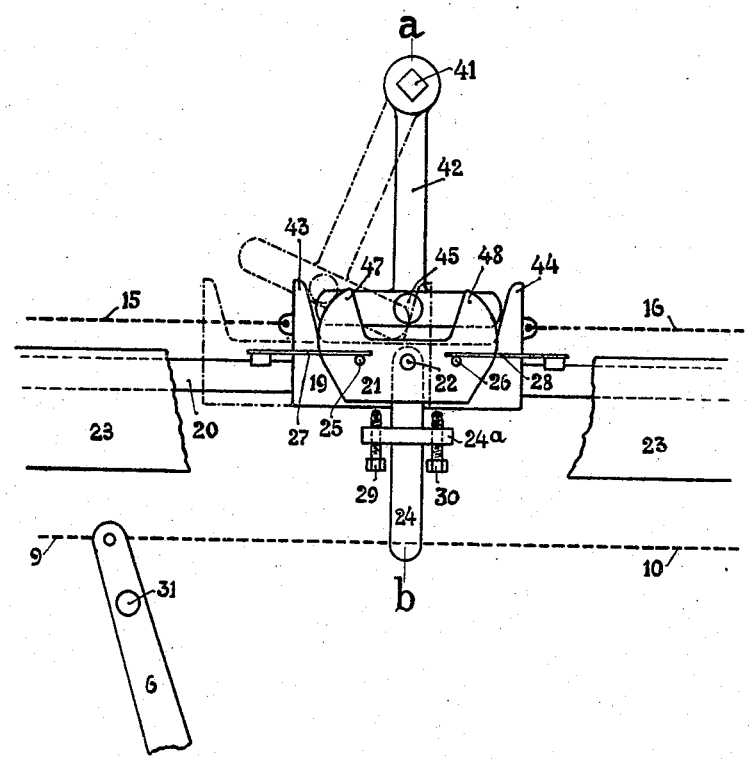
Fig. VIII.
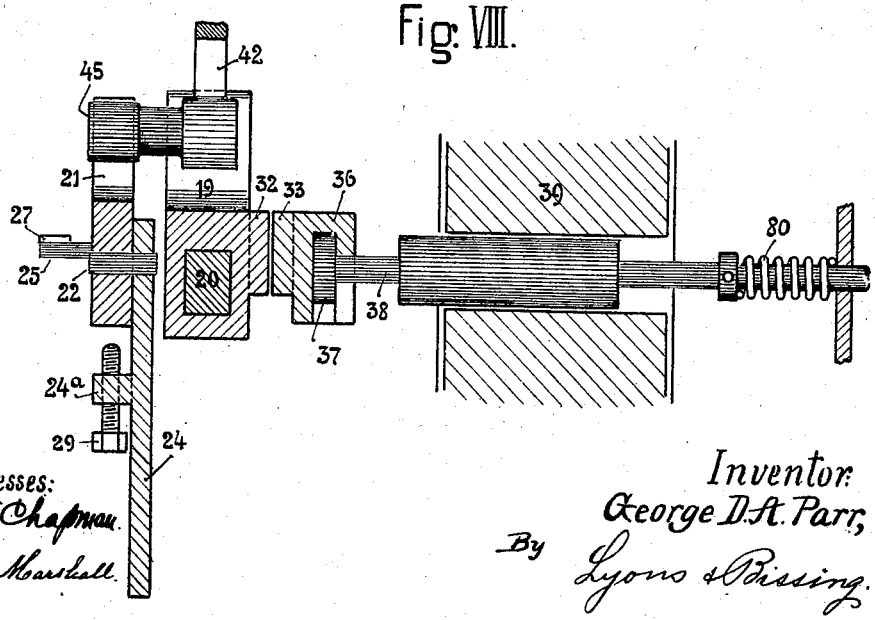
Witnesses:
F. J. Chapman
C. E. Marshall
Inventor:
George D. A. Parr,
By Lyons & Rissing.
Attorneys.

No. 867,528. PATENTED OCT. 1, 1907.
G. D. A. PARR.
POINT SHIFTER FOR TRAMWAYS AND THE LIKE.
APPLICATION FILED AUG. 18, 1905.
5 SHEETS—SHEET 3.
Fig. IV.
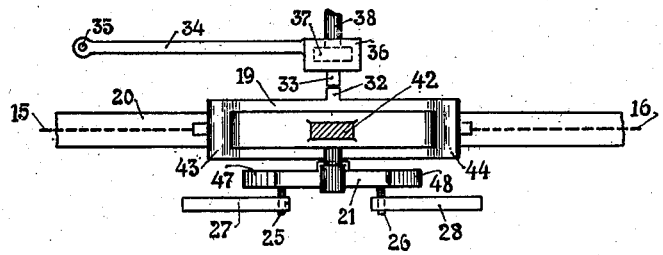
Fig. V.
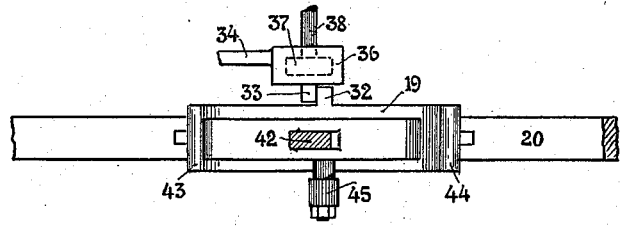
Fig. VI.
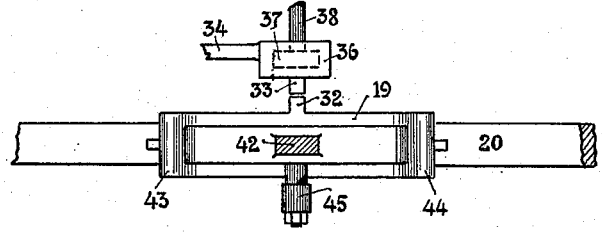
Fig. VII.
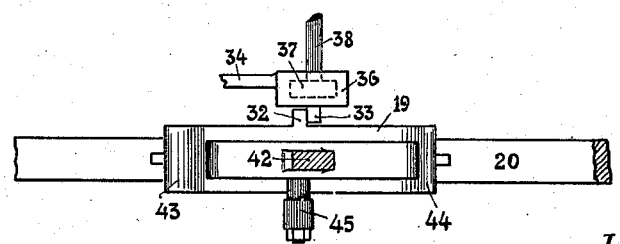
Witnesses:
F. T. Chapman
C. E. Marshall
Inventor:
George D. A. Parr,
By Lyons & Bissing
Attorneys.

No. 867,528. PATENTED OCT. 1, 1907.
G. D. A. PARR.
POINT SHIFTER FOR TRAMWAYS AND THE LIKE.
APPLICATION FILED AUG. 18, 1905.
5 SHEETS—SHEET 4.
Fig. IX.
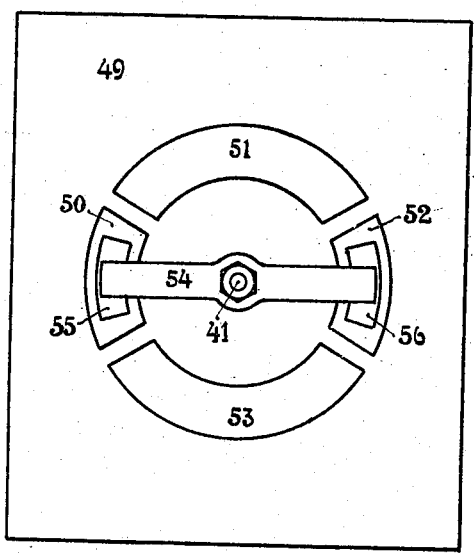
Fig. XII.
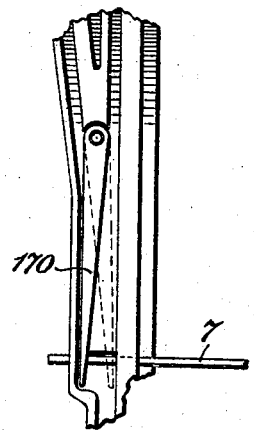
Fig. XI.
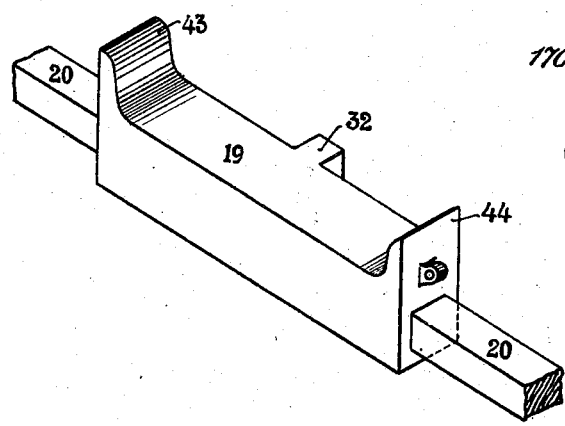
Witnesses:
F. T. Chapman
C. E. Marshall
Inventor:
George D. A. Parr.
By Lyons & Biising
Attorneys.

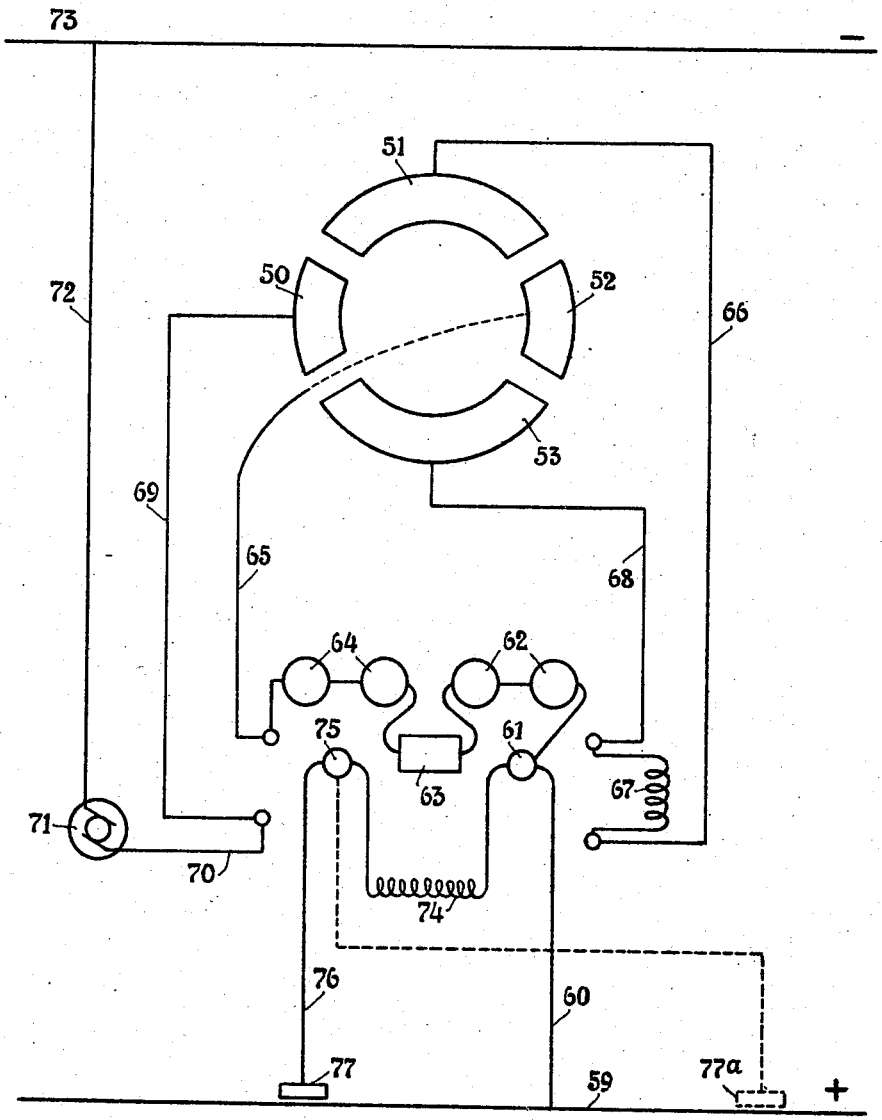

UNITED STATES PATENT OFFICE.

GEORGE DUDLEY ASPINALL PARR, OF LEEDS, ENGLAND.

POINT-SHIFTER FOR TRAMWAYS AND THE LIKE.

No. 867,528.           Specification of Letters Patent.           Patented Oct. 1, 1907.

Application filed August 18, 1905. Serial No. 274,789.

*To all whom it may concern:*

Be it known that I, GEORGE DUDLEY ASPINALL PARR, a subject of the King of Great Britain and Ireland, residing at The University, Leeds, in the county of Yorkshire, England, have invented new and useful Improvements in Point-Shifters for Tramways and the Like, of which the following is a specification.

This invention relates to point shifters specially though not exclusively applicable to electric tramways and by means of which efficiency and reliability are obtained.

In the accompanying drawings, Figure I is a front view of the point shifter with the outer case removed, and Fig. II is a side elevation of the same. Fig. III is a front elevation showing certain details connected with the operation of the reversing switch, and Fig. IV is a plan thereof. Figs. V, VI and VII are plan views of the slider, latch and bolt in their different positions. Fig. VIII is a section on the line $a$—$b$ of Fig. III on a slightly larger scale. Fig. IX represents the reversing switch, and Fig. X is a view of connections. Fig. XI is a perspective view of the slider. Fig. XII is a view of the switch point.

In order that this invention may be more readily understood, it will now be described with reference to one typical or illustrative form thereof, the said typical form giving good results in practice. In this typical form, 1 is an electro-motor, preferably series wound on account of the larger starting torque thus obtained. This electro-motor is connected by the spur wheel and pinion gearing 2 to the rocking shaft 3, this gearing being such that the shaft 3 is only moved through a comparatively small angular distance round its geometric axis by a number of revolutions of the armature of the electro-motor 1. This electro-motor is controlled by the reversing switch 4, which not only reverses the current through the field of the electro-motor, but makes and breaks its circuit. The action of this reversing switch will be described later. When current passes through the field of the electro-motor in one direction, rock shaft 3 is moved through an angular distance in one direction, and when the current passes in the reverse direction the rock-shaft is moved in the opposite angular direction. Upon the rock-shaft 3 are mounted two arms 5 and 6, 5 extending downwards and 6 extending upwards, so that as the rock-shaft is rocked these arms are moved angularly alternately in clockwise and counter clockwise directions. To the end of the arm 5 the hauling rod 7 is loosely articulated at the point 8. It is connected directly or indirectly with the point 170 upon the track which is to be operated, so that when the rock-shaft rocks in one direction the point is closed, and when in the other direction the point is opened.

In order to control these movements I employ, in the typical form now under description, the mechanism which I shall now proceed to describe.

To the upper end of the arm 6 is attached the inner ends of the chains 9, 10, which chains I term the lower chains, to distinguish them from two other chains hereinafter mentioned, and which I term the upper chains. These lower chains pass over the pulleys 11, 12, and their outer ends are attached to the weights 13, 14. To these weights are secured the outer ends of two other chains 15, 16, hereinbefore referred to as the upper chains. These pass over the pulleys 17, 18, and their inner ends are connected to the slider 19. Slider 19 is of the form shown in perspective in Fig. XI, and it is mounted on the slide-bar 20, so as to be capable of sliding along the same when pulled in one direction or the other by the upper chains. The ends of the slide-bar 20 are attached in any convenient manner to the frame of the machine. In front of the slider is a tripping catch 21, mounted loosely upon a pin 22, projecting from the member 23, of the frame of the machine. This tripping catch has two pins 25, 26 projecting from its front surface, and upon these blade springs 27, 28 press, for the purpose of maintaining the catch 21 in its horizontal position. Loosely pivoted on pin 22 is a hanging arm, catch releaser or trip 24, having a cross-piece $24^a$ thereon. Upon this cross-piece, at each side of the hanging arm, are set screws 29, 30, which can be screwed up or down for adjustment.

31 is a roller pin mounted at the upper extremity of arm 6, this roller pin being designed to move the hanging arm 24 in the manner and for the purpose hereinafter described.

32 is a projection extending backwards from the slider 19, and it abuts against one side or other of the projection 33, which extends forward from the latch 34, which latter is pivoted upon the spindle 35. The latch 34 carries a hollow or box-like boss 36, into which penetrates the head 37 of a bolt 38, which forms part of, or is attached to, the armature of an electro-magnet 39. When current passes through this electro-magnet its armature is attracted, and, by reason of the engagement of the head 37 in the box 36, the latch 34 is pulled backwards to such an extent that projection 33 is free of the path of the projection 32 when the latter is moved in one direction or the other.

It has been stated that slider 19 moves to and fro along the slide-bar 20. This movement is designed for the purpose of actuating the reversing switch at the proper times in order to control the passage of the current through the electro-motor as required. The reversing switch 4 is mounted upon the box 40 through which passes the shaft 41. This shaft bears the switch arm 54 at its rear end, and the tee-arm 42 at its fore end. The box 40 serves as a support not only for the reversing switch but also for the shaft 41, and it contains nothing save a spring or weight of the usual kind which is designed normally to maintain the switch arm in its horizontal position and the tee-arm in its vertical or hanging position. The tee-arm is so termed because it resembles an inverted letter T, the horizontal part of which lies between the cheeks or horns 43, 44 of the slider 19. 45 is a roller pin which is attached to, and projects forward from, the tee-arm, and lies normally between the horns 47, 48 of the trip 21. The said horizontal part of the tee-arm is made somewhat shorter than the distance between the horns 43, 44 of the slider, in order that when the slider is moved from side to side some momentum may be attained before a horn comes in contact with the said horizontal part: in other words, for the purpose of requiring less initial exertion to bring about the required movement as will be hereinafter described.

The reversing switch is shown separately in Fig. IX. 49 is an insulating base of slate or the like, and 50, 51, 52, 53 are four contact blocks attached thereto. 55, 56 are two brushes attached to the extremities of the insulating arm 54 carried by the shaft 41. The brushes 55, 56 are of such width as to bridge across the spaces between the adjacent contact blocks of the switch.

It has been stated that as the rock shaft 3 rocks in one angular direction or the other the track point is opened or closed; and it has been shown that it is the direction of rotation of the electro-motor which determines the angular direction in which the rock shaft moves. It is therefore the direction of rotation of the electro-motor which determines whether the point is opened or closed, and, as the point must be opened and closed alternately, so the electro-motor must be caused to rotate alternately in opposite directions. This is effected by passing the current at alternate transmissions through one element of the electro-motor (preferably the field) in opposite directions; and this is effected by operating the reversing switch by moving the tee arm alternately to right and left; it being borne in mind that the said tee arm and the insulating switch arm 54 are both fast on the shaft 41, so that each movement of the tee-arm to right or left reverses the position of the switch arm 54, and reverses the direction of the current through the electro-motor. The movement of the tee-arm is brought about by the movement of the slider 19 to right or left, and that movement is caused by the descent of the weights 13, 14 acting through the upper chains, the descent of weight 13 moving slider and tee-arm to the left, and that of weight 14 moving them to the right. But in order that these weights may act alternately it is necessary that they should be alternately elevated, and this is effected by the arm 6 acting through the lower chains, so that weight 13 is raised when arm 6 moves to the right, and weight 14 when it moves to the left. But it has been shown that arm 6 is moved by the electro-motor, so that will be seen that, while it is the energy stored in the weights which closes the reversing switch, it is the electrical energy consumed by the electro-motor which not only moves the track point but also raises the weights. This electrical energy is derived from the supply conductor as will be explained.

The circuits may be as diagrammatically represented in Fig. X. 59 is the supply conductor (trolley wire, third rail, conduit strip or other) and from it a permanent lead 60 is taken to terminal 61 of the shifter. From this the circuit is through lamps, or other convenient forms of resistance, 62, fuse 63, lamps 64 and lead 65 to contact block 52. Here it will be seen that the circuit is broken when the switch arm is in its normal position as shown in Fig. IX. When however the switch arm 54 is moved so that brush 56 bridges between contacts 51 and 52, and brush 55 between contacts 50 and 53, then the circuit is completed; and current will now pass from terminal 61 to contact block 52 as before mentioned, and will continue by brush 56, contact block 51, lead 66, field magnet coil 67 (in an upward direction), lead 68, contact block 53, brush 55, contact block 50, lead 69, lead 70, armature 71, lead 72, to rail 73 and earth. Let us assume now that this transmission of the current has moved the point in one direction as aforesaid, and that the weight which moved the contact arm 54 into the position just mentioned has been lowered, and the other weight elevated, as before. At the next withdrawal of the bolt 38 the weight which is now in the elevated position will move the switch arm over, so that brush 55 will connect contact blocks 50 and 51, and brush 56 connect contact blocks 52 and 53. Current will now pass from the terminal 61 to 52 as before, but it will then pass from contact block 52 through brush 56, contact block 53, lead 68, field magnet coil 67 (in the reverse direction from that on the previous occasion), lead 66, contact block 51, brush 55, contact block 50, lead 69, lead 70, armature 71 (in the same direction as before), lead 72 to rail 73 and earth. It will be seen therefore that although there is a permanent connection between the supply conductor and terminal 61 no current can pass when arm 54 is in its normal position, and adjacent contact blocks are not connected.

The circuit for actuating the bolt 38 is as follows:— by lead 60, terminal 61, the coil 74 of electro-magnet 39, terminal 75, lead 76, to contact 77. This circuit is only completed when the trolley head or other collector makes contact with contact piece 77. The circuit is then completed from contact piece 77, through the motor-man's controller, car motor, wheels and rails to earth, so that the said electro-magnet is energized, the bolt withdrawn, and the various elements brought into operation as will now be described.

Let us assume that the parts are in the position shown in Figs. I, III, IV and VIII, chains 9 and 16 being slack, and chains 10 and 15 being tight, and supporting their respective weights. The collector has made contact with contact piece 77 (see Fig. X), so as to close the circuit through the electro-magnet 39. Bolt 38 will be pulled in by electro-magnet 39, and the latch 34 will be pulled backwards, so that projection 33 will be removed from the path of the projection 32 (see Fig. VI). Slider 19 will be pulled to the left by the dropping of weight 13, horn 44 will come against the horizontal part of the tee-arm and will move the latter into the position shown in dotted lines. During its course in this direction the roller pin 45 comes against horn 47 of the trip 21 and depresses the left hand end thereof, against the action of spring 28, until it (the roller pin 45) rides over the said horn 47, when it is detained by the said horn in the position shown in dotted lines in Figs. I and III. This motion of the tee-arm will have closed the circuit through the reversing switch, the arm 54 of which is now in such position that brush 55 connects contact blocks 50 and 53, and brush 56 connects blocks 51 and 52. The circuit is now completed through the electro-motor as before mentioned, and the arm 6 (see Figs. I and III) will now move from left to right, while the track point is opened or closed as the case may be. In so moving to the right, arm 6 will raise weight 13 by its pull upon chain 9 while chain 10 is slackened. During the course of arm 6 from left to right, however, roller pin 31 will have come against hanging arm 24, and will move it counter-clockwise, so that set screw 30 will press the right hand side of trip 21 upwards, thus depressing horn 47, which no longer detains roller pin 45, and the tee-arm now springs back into its normal position as shown in full lines in Figs. I, III and VI, this springing back being brought about by the spring hereinbefore mentioned as being situated within box 40. This brings the switch arm into its normal position again, so as to open the circuit through the reversing switch and electro-magnet. At the same time while chain 9 has been tightened and chain 10 slackened by the passage of arm 6 from left to right, chain 15 has been slackened and chain 16 tightened. These chains 15 and 16 being attached to slider 19 the latter is brought back into its normal position, and it is retained in this position through projection 32 coming in contact with projection 33 (see Fig. VII), it being understood of course that, on account of the contact with contact piece 77 being almost momentary, the energizing of magnet 39 is almost momentary, and that spring 80 (see Fig. VIII) has forced bolt 38 and with it latch 34 back into its normal or detaining position.

It will be seen that when the arm 6 moves from left to right, as just described, it will not merely bring the slider 19 back to its central or normal position with its projection 32 contacting with the latch 33 as shown in Fig. VII. The motion of the arm 6 will be continued beyond the point necessary to bring about this juxtaposition of the parts so as to slack the chain 10 and stretch the chain 16. Power is thus stored in the weight 14 which is thereby enabled, upon the next withdrawal of the latch 33, to throw the slider 19 toward the right and with it the reversing switch into a position opposite to that shown in dotted lines in Fig. 1. We may thus have the arm 6 at the left, in Fig. I, and the projection 32 of the slider 19 in the position shown in Fig. V. Or we may have the arm 6 toward the right in Fig. I and the projection 32 of the slider 19 in the position shown in Fig. VII. In the one case power will be stored in the weight 13 and in the other case power will be stored in the weight 14 to throw the slider 19, and with it what is in effect the switch arm 42, to the left or to the right to send current through the motor in one direction or the other. I therefore call these weights and the parts connected thereto, which they operate, a power-storing device. It will be seen that this power-storing device, as above stated, is energized or gets its energy from the electric motor and that it in turn operates the reversing switch.

It will of course be understood that contact is made with the contact piece 77 an appreciable time before the car reaches the track point, and that to put the point back to the position which it occupied before it was actuated, as I have just described, all that is necessary is, for example, to place another contact piece in series with contact piece 77 or connect such a second contact piece 77ᵃ by a lead with terminal 75, at which piece 77ᵃ contact will be made after the point has been passed by the car.

It is obvious that if the motor-man wishes to pass the point without shifting it, all he has to do is to coast past the pieces 77 and 77ᵃ with his controller in the "off" position. There is then no circuit from contact pieces 77 and 77ᵃ to earth. It is not necessary to have two contacts when each driver "sets" the points for himself, as one will suffice.

One can do without the latch 34 by causing the bolt 38 to engage projection 32, in which case the head of the said bolt simply fulfils the function of the projection 33. In such case the bolt must of course be reinforced by bearings or stops on each side to prevent damage.

We have hereinbefore referred to the actuation of a track point by the shifter, but it is obvious that it may also be employed to actuate for example the point on a frog in an overhead conductor, or in the conducting strip in a conduit. All that is necessary is to form a mechanical connection between a suitable part of the shifter and the tongue of the point. For example, in the case of an overhead frog, all that would be necessary would be to take a chain or cord from arm 5 over suitably placed pulleys to the tongue of the frog.

It is obvious that the invention is not restricted to electric tramways or railways, for it can be used in connection with ordinary tramways or railways actuated by other motive power. In such cases all that has to be done is to lead the conductor 60 to any convenient source of electrical energy, and to provide the car with means for conducting current from contacts 77 and 77ᵃ to earth.

It is to be understood that the invention is not limited to the precise details hereinbefore specified, as it is obvious that any competent engineer, conversant with the spirit of the invention, might modify these details to an indefinite extent. For example the arm 42 is not necessarily of the form of a T. All that is necessary is that it should be adapted for engagement with the slider and its roller pin 45 for engagement with the trip. Nor is it necessary that the slider should be of the form shown. Almost any form with pressing surfaces to take the place of the horns, and with a space between them, would suffice, and a similar statement applies to the trip.

In practice one may place a yielding clutch or other yielding connection in any convenient shaft of the gearing 2, and one may substitute worm gearing for the whole or a part of the spur gearing.

By way of a summary of the operation, I may assume the parts in the position of Fig. I and Fig. V. The motorman, sending current through the magnet 39, withdraws the catch 33, thus permitting the energy stored in weight 13 to throw the slider 19 and with it the arm 42 toward the left. This arm 42 is caught by the catch 21 in the position shown in dotted lines in Fig. I. The circuit being now closed through the motor, the arm 6 is gradually moved towards the right until the arm 6, acting against the trip 24, turns the catch 21 on its pivot and allows the arm 42 to return to its normal or central position to which is is biased. The motion of the arm 6 has in the meanwhile returned the slide 19 to its central position and has in addition stored power in the weight 14. By the time the motor is finally cut out, the arm 6 lies to the right, in Fig. I, the catch 33 engages the slide in the position shown in Fig. VII and power is stored in the weight 14. The next operation of the magnet 39, for instance through the contact point 77ª of Fig. X, effects each of the operations just recited in a reverse direction.

Having thus described my invention what I claim as new and desire to secure by Letters Patent is:—

1. A switch-point, an electric motor for operating the same, a switch in the motor circuit, a power-storing device energized by the motor and operating the switch, and an electrically-controlled latch for the power-storing device operated from the car, substantially as described.

2. A switch-point, an electric motor for operating the same, a reversing switch in the motor circuit, a power-storing device energized by the motor and moving the switch alternately into its reversing positions, and an electrically controlled latch therefor operated from the car, substantially as described.

3. A switch-point, an electric motor for operating the same, a reversing-switch in the motor circuit, a power-storing device energized by the motor and moving the switch alternately in opposite directions into its reversing positions, and an electrically controlled latch operated from the car normally restraining the action of the power-storing device irrespective of the direction in which it has a bias to move, substantially as described.

4. A switch-point, an electric motor for operating the same, a switch in the motor circuit, a power-storing device for operating the switch comprising weights alternately raised and lowered by the motor, said weights being connected by partially stretched and partially loose chains, and an electrically controlled latch for the power-storing device, substantially as described.

5. A switch-point, an electric motor for operating the same, a switch in the motor circuit, a power-storing device energized by the motor and comprising a slider operating the switch, and a latch for the slider, substantially as described.

6. A switch-point, an electric motor for operating the same, a switch in the motor circuit biased to stay in a normal position, a power-storing device for operating the switch energized by the motor and comprising a tripping-catch for holding the switch out of its normal position, and a latch for the power-storing device, substantially as described.

7. A switch-point, an electric motor for operating the same, a reversing switch in the motor circuit biased to stay in a central position, a power-storing device for operating the switch energized by the motor and comprising a tripping catch for holding the switch to either side of its central position, and a latch for the power-storing device, substantially as described.

8. A switch-point, an electric motor for operating the same, a switch in the motor circuit biased to stay in a central position, a power-storing device for operating the switch energized by the motor and comprising a catch for holding the switch to either side of its central position, and a loosely pivoted arm operated by the motor for tripping the catch, substantially as described.

9. A switch-point, a pair of hanging weights connected by a pair of chains, each chain having a loose section adjacent to one of the weights, a latch and a connection from the switch-point to one of the chains; whereby motion of the switch-point in opposite directions alternately raises and lowers the weights and reverses the position of the loose sections of chain to constitute a power-storing device, acting in either direction, substantially as described.

10. A switch-point, a pair of hanging weights connected by a pair of chains, each chain having a loose section adjacent to one of the weights, a latch and a p'voted arm connected to the switch-point and to one of the chains, the whole constituting a power-storing device acting in either direction, substantially as described.

11. A switch-point, an electric motor for operating the same, an electric switch controlling the motor normally biased to a central position, a weight-actuated slide moving the switch alternately in opposite directions, a pivoted catch for holding the switch in either of its extreme positions, and a trip for releasing the catch and permitting the switch to return to its central position, substantially as described.

In witness whereof I have signed my name to this specification in the presence of two subscribing witnesses.

GEORGE DUDLEY ASPINALL PARR.

Witnesses:
WM. GOODALL CHAMBERS,
CHAS. GILLIARD.